Dec. 2, 1930.   F. A. AUGENTHALER   1,783,870
CHUCK FOR TORSIONAL STRESSES
Filed Oct. 16, 1928
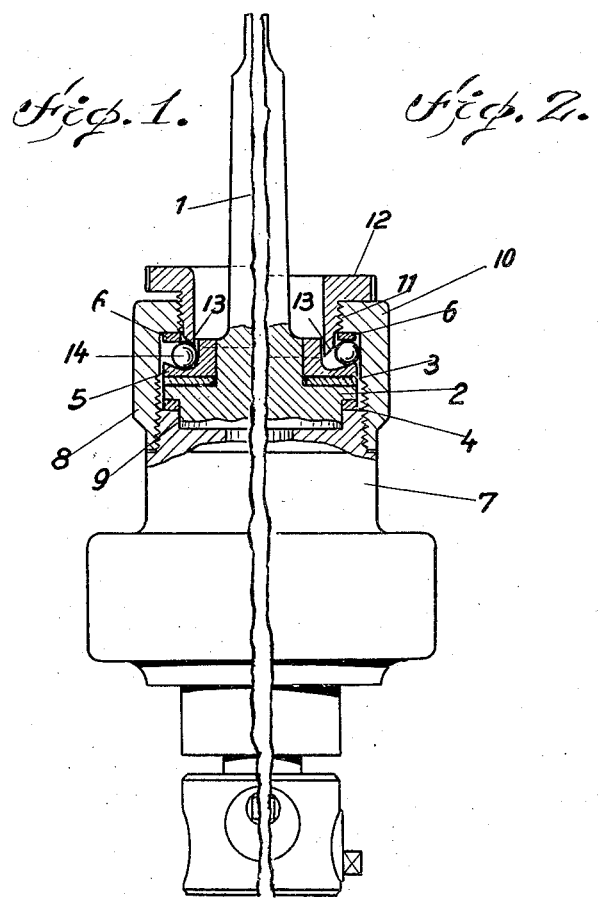
Inventor
Friedrich Anton Augenthaler Patented Dec. 2, 1930

1,783,870

UNITED STATES PATENT OFFICE

FRIEDRICH ANTON AUGENTHALER, OF BERLIN, GERMANY

CHUCK FOR TORSIONAL STRESSES

Application filed October 16, 1928, Serial No. 312,883, and in Germany December 1, 1927.

This invention has reference to improvements in chucks for rotating tools, and in particular to safety-coupling and connecting means to be employed with such tools and intended for the purpose of transmitting rotating strains and torques occurring by the operation of the working shafts of such tools, as for instance thread-cutters, drill borers and the like, to the tools themselves or to other moving parts of machinery. Fastening collets and chucks have been disclosed by the previous art in which the positioning of the tools is controlled by hand, and it has also been suggested to employ clamping jaws which are forced against the tools by means of a series of balls and of two conical operating surfaces. With these previous suggestions there is however the difficulty that they will only operate satisfactorily with tools working in one single direction only. Nor is it possible by means of the instrumentalities referred to to securely and undisplaceably adjust and lock the clamping chuck or collet to a nicety for a previously determined torque or torsional strain in both directions. Instead of becoming delicately adjusted the tool, when secured by the chucks as heretofore employed and suggested, will bind and is liable to be clamped the more tightly the greater the strain to which it is exposed, so that with the previous arrangements there was practically no reliable protection against rupture of tools.

Now in accordance with this invention an exact and delicate adjustment of the clamping means in both directions of rotation is accomplished by the use of a frictional coupling in which the opposed bearing surfaces for the series of balls are provided with conical surfaces of different configuration or inclination. By this means it becomes possible to force the balls outwardly in a strictly radial direction to cause relative movement in an axial direction between said conical bearing surfaces, so that the driving spindle or shaft may be tightly pressed against the boring chuck or the like. In view of the fact that the balls are engaging the conical bearing surface of the ball-race in tangential points only there is no necessity for an absolutely exact adjustment of the boring chuck or the like.

In the accompanying drawing:

Figure 1 represents a view of a segment, partly in section and partly in elevation, of a frictional coupling or chuck embodying my invention, the parts being disposed in one extreme position; and Figure 2, a view similar to Fig. 1 with the parts disposed in their other extreme position.

The invention will be more particularly described with reference to the accompanying drawing showing by way of exemplification the frictional coupling embodying the principles of my invention in vertical longitudinal section and in two different positions. The driving spindle 1 shown in the drawing carries a flange 2 projecting into the outer casing. Upon this flange an annular disc 3 of elastic or resilient material, such as for instance vulcan-fibre is supported and adapted for the transmission of the different torques or rotary strains of the driving spindle 1. Another ring-shaped disc 4 serving the same purpose is disposed beneath the flange 2. In accordance with my invention an annular ball race 5 is mounted upon the upper disc 3, the balls 14 being arranged in the conical journal or pocket of the race 5. As a closure for the pocket a steel ring 6 is provided which absorbs the pressure of the balls in the adjustment of the frictional coupling. The lower frictional ring 4 rests directly upon the boring chuck 7, and by the friction caused thereby it transmits the rotary or torsional strain of the driving shaft 1 upon the boring chuck 7. As a closing means for the entire coupling a check-nut 8 is provided which is screwed onto the chuck 7 by the threads 9. The nut is provided in its upper portion 10 with the interior threads 11 engaging with the screw threads of an adjusting ring 12 terminating at its lower end in a conical surface 13 adapted to bear upon the balls 14.

The conical surface 13 of the adjusting ring 12 will extend at a different angle to the axis of the chuck than the opposed annular conical surface of the ball race 5, and in the embodiment illustrated such angle of inclination of surface 13 is appreciably less than the angle of said opposed conical surface of race 5, so that as the adjusting ring 12 is turned in to the check-nut 8 its lower conical surface 13 will force the balls 14 radially outward, said balls 14 in turn bearing against the conical surface of the race 5 and forcing the latter in an axial direction toward the chuck 7 and away from conical surface 13 in order to afford room for the radial movement of the balls 14.

The operation of the device is substantially as follows:—By screwing the adjusting ring 12 into the threaded part 11 the conical surface 13 of the ring will force the balls 14 outwards in the radial direction, so that by means of the ball race 5 the flange 2 of the driving spindle or shaft 1 is pushed against the boring chuck 7. The pressure of the frictional coupling produced by this movement depends merely upon the relative depth of adjustment of the conical surface 13. Inasmuch as the balls 14 are engaging their conical bearing surfaces in tangential points only, the pressure required for the adjustment of the frictional coupling is very low and may easily be accurately adjusted by manipulating the adjusting ring 12, while the action produced upon the driving spindle 1 is comparatively very considerable. The new kind of coupling means may be employed in connection with machine tools of different kinds, and in connection with driving instrumentalities, as for instance with trains of operating gears and the like.

It will have to be understood that various modifications may be made in the construction shown within the principle and scope of this invention, as defined by the appended claims.

I claim:—

1. A casing, two rotatable parts held in operative relation and in axial alignment by said casing, and frictional means interposed between said rotatable parts, in combination with bearing balls, a ball race arranged in said casing concentric with the axes of said rotatable parts and having an annular conical surface engaged by said balls, and an adjusting member having an annular conical surface concentric with said ball race and engaging said balls, the conical faces of said adjusting member and of said ball race extending at different angles with relation to their common axis.

2. A driving member, a driven member, means for maintaining said members in axial alignment, and a yielding friction element interposed between said members to be engaged and compressed by the opposing faces thereof, in combination with bearing balls, a ball race disposed in said means concentric with the common axis of said members, said ball race having an annular conical bearing surface for said balls, and an adjusting ring having a conical bearing surface disposed concentrically with relation to, and in opposition to, said ball race, said conical bearing surface of said adjusting ring extending at a different angle with relation to its axis than the opposed conical face of said ball race.

3. A driving member, a driven member, means for maintaining said members in axial alignment, and a yielding friction element interposed between said members to be engaged and compressed by the opposing faces thereof, in combination with bearing balls, a ball race disposed in said means concentric with the common axis of said members, said ball race having an annular conical bearing surface for said balls, a yieldable friction element interposed between said ball race and one of said members, and an adjusting ring having a conical bearing surface disposed concentrically with relation to said ball race and engaging said balls, said conical bearing surface of said adjusting ring extending at a different angle with relation to its axis than the opposed conical face of said ball race.

4. A chuck comprising a casing, bearing balls disposed therein, a ball race disposed in said casing for displacement in an axial direction thereof and arranged concentric with the axis thereof and having an annular conical bearing surface for said balls, in combination with an adjusting ring projecting into said casing concentric with said ball race and having a conical bearing surface presented in opposition to the bearing surface of said ball race and engaging said balls, said conical bearing surface of said ring extending at a different angle with relation to its axis than the corresponding angle of said bearing surface of said ball race.

5. A chuck comprising a casing, bearing balls disposed therein, a ball race disposed in said casing for displacement in an axial direction thereof and arranged concentric with the axis thereof and having an annular conical bearing surface for said balls, in combination with adjusting means projecting in said casing and causing movement of said balls in a radial direction in contact with said ball race, whereby the latter is caused to move in an axial direction.

In testimony whereof, I have signed my name to this specification at Berlin this 28th day of September, 1928.

FRIEDRICH ANTON AUGENTHALER.